United States Patent Office 3,364,236
Patented Jan. 16, 1968

3,364,236
3 - KETO - Δ⁴ - UNSATURATED - 6 - FORMYL STEROIDS AND PROCESS FOR THE PRODUCTION THEREOF
Erwin F. Schoenewaldt, Watchung, N.J., and Lawrence B. Bailey, Jr., Somerset, Mass., assignors to Merck & Co., Inc., Rahway, N.J., a corporation of New Jersey
No Drawing. Continuation-in-part of application Ser. No. 244,575, Dec. 14, 1962. This application Sept. 27, 1965, Ser. No. 490,703
9 Claims. (Cl. 260—397.3)

This is a continuation in-part of our copending application Ser. No. 244,575 filed Dec. 14, 1962, now abandoned.

This invention relates to novel steroid compounds and processes for preparing the same. More particularly, this invention relates to novel 6-formyl steroids of the pregnane and androstane series and methods for making these compounds. These 6-formyl compounds are useful as intermediates in the preparation of other 6-substituted steroids having therapeutic activity.

These 6-formyl steroids of the pregnane and androstane series, subject of the present invention, may be represented by the following partial formula:

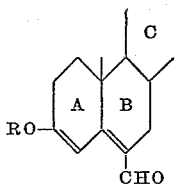

wherein R is alkyl. The remaining portion of the steroid nucleus may have attached thereto substituents such as hydrogen or halogen at C-9, hydrogen, keto or hydroxy at C-11, hydrogen or lower alkyl at C-16, and keto, hydroxy or a pregnane side chain at C-17.

In accordance with the present invention, these novel 6-formyl steroids may be prepared by reacting a 3-enol ether of a 3-keto-Δ⁴-steroid with phosgene and dimethylformamide in a suitable organic solvent, such as methylene chloride, carbon tetrachloride or benzene, and preferably chloroform, to form the corresponding 3-alkoxy-6-formyl-3,5-pregnadiene or androstadiene compound. This reaction may, for example, be conveniently carried out by first preparing a solution of phosgene and dimethylformamide by adding phosgene in chloroform to a solution of dimethylformamide in chloroform at low temperature, preferably about 0° C. Although the amount of these reagents is not critical, it is desirable to carry out the reaction in an excess of dimethylformamide, preferably in a ratio of about 1 mole of phosgene to 3 moles of dimethylformamide. After the solution has been stirred at room temperature for from 1–3 hours, the solution is again cooled to about 0° C. and the desired steroid 3-enol ether starting material dissolved in chloroform is added. The reaction mixture is then allowed to stand for 5 to 24 hours, preferably at room temperature, whereupon the 6-formyl compound may readily be recovered by adding water to the reaction mixture to form an organic phase and an aqueous phase, extracting the aqueous phase with an organic solvent, preferably a chloroform-ethanol mixture, and evaporating the combined organic phases to dryness.

The recovered 6-formyl steroid product may be further purified by redissolving it in a solvent such as benzene or the like, extracting this solution with formamide, backwashing with benzene, washing the combined benzene extracts with water and evaporating them to dryness to yield a substantially pure 3-enol ether of a 6-formyl steroid. Reversal of the 3-enol ether to the corresponding 3-keto-Δ⁴-compound is readily achieved by dissolving the 3-enol ether compound in a suitable solvent such as methanol, acetone or the like, adding a drop of a concentrated mineral acid such as HCl, and evaporating the solution to dryness.

The starting materials employed in this process are 3-enol ethers of Δ⁴-steroids of the pregnane and androstane series having the partial structural formula:

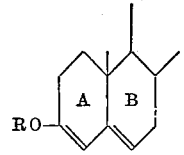

wherein R is a lower alkyl radical having from one to three carbon atoms, and preferably is methyl or propyl. Thus, such compounds as the 3-enol ethers of cortisone or hydrocortisone, or the 16-methyl and/or 9α-fluoro derivatives thereof, progesterone, testosterone or the like may be employed as starting materials in the present process. While not necessary, existing pregnane side chains may have attached thereto suitable protective groups to protect any oxygen functions which may be present. Desirable 21-hydroxy-steroids are employed as the corresponding 21-ester of a monocarboxylic acid such as acetic, propionic or the like. These 3-enol ether starting materials may be prepared by reacting the corresponding 3-keto-Δ⁴-compound with an alkyl orthoformate in the presence of an acetic catalyst.

The 6-formyl-steroids of our invention are intended to include the enol tautomeric form (6-hydroxymethylene-steroids). The 6-formyl-progesterone, for instance, will be in tautomeric equilibrium with the 6-hydroxymethylene-progesterone to a variable extent as shown in the following formulas:

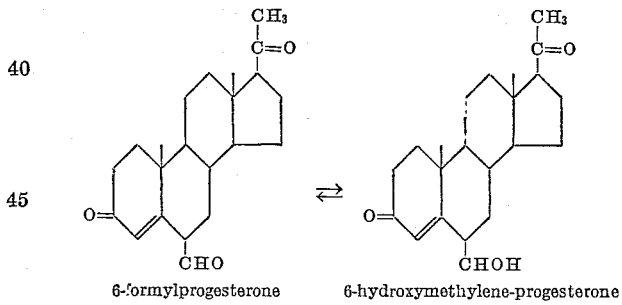

6-formylprogesterone     6-hydroxymethylene-progesterone

The 6-formyl-steroids produced in accordance with the present process are readily converted to corresponding 6-substituted steroids having anti-inflammatory, progestational or androgenic activity. Thus, for example, the reaction of a 3-enol ether of 6-formyl-20-ethylenedioxy-progesterone with a reducing agent such as sodium borohydride followed by treatment with an organic acid, as for example, p-toluenesulfonic acid, yields 6-methylene-progesterone which possesses progestational activity. Similarly, reduction of a 3-enol ether of 6-formyl hydrocortisone having suitable protective groups, such as a bismethylenedioxy-group, on the 17-side chain, followed by reaction with p-toluenesulfonic acid and removal of the bismethylenedioxy-group with formic acid produces 6-methylene-hydrocortisone, an anti-inflammatory agent.

The subject 6-formyl steroid intermediates are also useful in the preparation of 6α-methyl-substituted steroids such as 6α-methyl-cortisone, 6α-methyl-17α-acetoxy-progesterone, and the like. These 6α-methyl-compounds may readily be produced from the corresponding 6-formyl-steroid by a Wolff-Kishner reaction. Thus, for example, reaction of the 3-propyl enol ether of 6-formyl-17α-acetoxy-20-ethylenedioxy-progesterone with hydrazine to form the corresponding 6-hydrazone and reduction of the hydrazone in the presence of an alkaline catalyst, preferably sodium ethoxide, produces the 3-propyl enol ether of 6-methyl-17α-hydroxy-20-ethylenedioxy-progesterone. Removal of the 20-ketal and 3-alkoxy groups by treatment with a mineral acid followed by acetylation of the 17α-hydroxy group yields 6α-methyl-17α-acetoxy-progesterone, which possesses high progestational activity. Similar treatment of the 6-formyl derivatives of cortisone 16α-methyl-cortisone, their 9α-fluoro derivatives, or the like, will yield the corresponding 6α-methyl-steroids possessing known anti-inflammatory activity.

The following examples illustrate methods of carrying out the present invention but it is to be understood that these examples are given for the purposes of illustration and not of limitation.

*Example 1*

To a solution of 5 g. of dimethylformamide dissolved in 12.5 ml. of chloroform is added 7.7 ml. of a 3.58 N solution of phosgene in chloroform (at 0° C.). The solution is stirred at 18–20° C. for 1½ hours and then cooled to 0° C. A solution of 750 mg. of 3-n-propyloxy-17α,21-dihydroxy-3,5-pregnadiene-11,20-dione 21-acetate dissolved in 2 ml. of chloroform is added to the cooled mixture and allowed to stand at room temperature overnight. Thereafter, the reaction mixture is added to 2.5 ml. of water which is saturated with potassium carbonate. Ten ml. of ethanol is added, the precipitated inorganic salts filtered off and the organic phase separated from the aqueous phase. The aqueous phase is then extracted twice with 25 ml. portions of chloroform containing 10–20% ethanol. The chloroform extracts are combined, dried over magnesium sulfate and evaporated to dryness.

The residue is dissolved in 120 ml. of benzene and washed three times with 120 ml. portions of formamide. The formamide extracts are back-washed with 80 ml. of benzene, after which the benzeen extracts are combined, washed with water, dried over sodium sulfate and evaporated to dryness to yield 400 mg. of 3-n-propyloxy-6-formyl-17α,21-dihydroxy-3,5-pregnadiene-11,20-dione 21-acetate.

In accordance with the foregoing procedure, but starting with 3-methoxy-9α-fluoro-11β,17α,21-trihydroxy-3,5-pregnadiene-20-one 21-acetate there is obtained the corresponding 3-methoxy-6-formyl-9α-fluoro-11β,17α,21-trihydroxy-3,5-pregnadiene-20-one 21-acetate.

*Example 2*

To a solution of 5 g. of dimethylformamide dissolved in 12.5 ml. of benzene is added 7.7 ml. of a 3.58 N solution of phosgene in benzene at 0° C. The solution is stirred at 18–20° C. for 1½ hours and then cooled to 0° C. A solution of 750 mg. of 3-n-propyloxy-9α-fluoro-11β,17α,21-trihydroxy-16α-methyl-3,5-pregnadiene-20-one 21-acetate dissolved in 2 ml. of benzene is added to the cooled mixture and allowed to stand at room temperature overnight. Thereafter, the reaction mixture is added to 2.5 ml. of water which is saturated with potassium carbonate. Ten ml. of ethanol is added, the precipitated inorganic salts filtered off and the organic phase separated from the aqueous phase. The aqueous phase is then extracted twice with 25 ml. portions of benzene containing 10–20% ethanol. The benzene extracts are combined, dried over magnesium sulfate and evaporated to dryness.

The residue is dissolved in 120 ml. of benzene and washed three times with 120 ml. portions of formamide. The formamide extracts are back-washed with 80 ml. of benzene, after which the benzene extracts are combined, washed with water, dried over sodium sulfate and evaporated to dryness to yield 400 mg. of 3-n-propyloxy-6-formyl-9α-fluoro-11β,17α,21-trihydroxy-16α-methyl-3,5-pregnadiene-20-one 21-acetate.

In accordance with the foregoing procedure, but starting with 3-methoxy-17α,21-dihydroxy-16β-methyl-3,5-pregnadiene-11,20-dione 21-acetate, there is obtained the corresponding 3-methoxy-6-formyl-17α,21-dihydroxy-16β-methyl-3,5-pregnadiene-11,20-dione 21-acetate.

*Example 3*

To a solution of 5 g. of dimethylformamide dissolved in 12.5 ml. of methylene chloride is added 7.7 ml. of a 3.58 N solution of phosgene in methylene chloride at 0° C. The solution is stirred at 18–20° C. for 1½ hours and then cooled to 0° C. A solution of 750 mg. of progesterone-3-methyl-enol-ether dissolved in 2 ml. of methylene chloride is added to the cooled mixture and allowed to stand at room temperature overnight. Thereafter, the reaction mixture is added to 2.5 ml. of water which is saturated with potassium carbonate. Ten ml. of ethanol is added, the precipitated inorganic salts filtered off and the organic phase separated from the aqueous phase. The aqueous phase is then extracted twice with 25 ml. portions of methylene chloride containing 10-20% ethanol. The methylene chloride extracts are combined, dried over magnesium sulfate and evaporated to dryness.

The residue is dissolved in 120 ml. of benzene and washed three times with 120 ml. portions of formamide. The formamide extracts are back-washed with 80 ml. of benzene, after which the benzene extracts are combined, washed with water, dried over sodium sulfate and evaporated to dryness to yield 400 mg. of 6-formylprogesterone-3-methyl enol ether.

In accordance with the foregoing procedure, but starting with 17α-acetoxyprogesterone 3-n-propyl enol ether, there is obtained the corresponding 6-formyl-17α-acetoxyprogesterone 3-n-propyl enol ether.

In accordance with the foregoing procedure, but starting with testosterone-3-methyl enol ether, there is obtained the corresponding 6-formyl-testosterone-3-methyl enol ether.

*Example 4*

To a solution of 5 g. of dimethylformamide dissolved in 12.5 ml. of chloroform is added 7.7 ml. of a 3.58 N solution of phosgene in chloroform at 0° C. The solution is stirred at 18–20° C. for 1½ hours and then cooled to 0° C. A solution of 750 mg. of 3-ethoxy-11β,17α-21-trihydroxy-3,5-pregnadiene-20-one 21-propionate dissolved in 2 ml. of chloroform is added to the cooled mixture and allowed to stand at room temperature overnight Thereafter, the reaction mixture is added to 2.5 ml. of water which is saturated with potassium carbonate. Ten ml. of ethanol is added, the precipitated inorganic salts filtered off and the organic phase separated from the aqueous phase. The aqueous phase is then extracted twice with 25 ml. portions of chloroform containing 10–20% ethanol. The chloroform extracts are combined, dried over magnesium sulfate and evaporated to dryness.

The residue is dissolved in 120 ml. of benzene and washed three times with 120 ml. portions of formamide. The formamide extracts are back-washed with 80 ml. of benzene, after which the benzene extracts are combined, washed with water, dried over sodium sulfate and evaporated to dryness to yield 400 mg. of 3-ethoxy-6-formyl-11β,17α,21-trihydroxy-3,5-pregnadiene-20-one 21-propionate.

In accordance with the foregoing procedure, but starting with 3-methoxy-3,5-androstadiene-17-one there is obtained the corresponding 3-methoxy-6-formyl-3,5-androstadiene-17-one.

*Example 5*

To a solution of 350 mg. of 3-n-propyloxy-6-formyl-17α,21-dihydroxy-3,5-pregnadiene-11,20-dione 21-acetate dissolved in warm methanol is added a drop of concentrated hydrochloric acid, the solution stirred and evaporated to dryness to yield 6-formyl-17α,21-dihydroxy-4-pregnene-3,11,20-trione 21-acetate.

In accordance with the foregoing procedure, but starting with 3-methoxy-6-formyl-9α-fluoro-11β,17α,21-trihydroxy-3,5-pregnadiene-20-one 21-acetate, there is obtained the corresponding 6 - formyl - 9α-fluoro-11β,17α,21-trihydroxy-4-pregnene-3,20-dione 21-acetate.

*Example 6*

When the 3-enol ether of the 6-formyl-3,5-pregnadiene and androstadiene end products of Examples 2, 3 and 4 are substituted as starting materials in the process of Example 5, there are obtained the corresponding 3-keto-6-formyl-4-pregnene and androstene compounds, as, for example, 6 - formyl-9α-fluoro-11β,17α,21-trihydroxy-16α-methyl-4-pregnene-3,20-dione 21-acetate; 6-formyl-17α,21-dihydroxy - 16β - methyl - 4 - pregnene - 3,11,20 - trione 21-acetate; 6-formylprogesterone; 6-formyl-17α-acetoxyprogesterone; 6-formyl-testosterone; 6-formyl-11β,17α,21-trihydroxy-4-pregnene-3,20-dione 21-propionate; and 6-formyl-4-androstene-17-one.

Various changes and modifications may be made in carrying out the present invention without departing from the spirit and scope thereof. Insofar as these changes and modifications are within the purview of the annexed claims, they are to be considered as part of our invention.

We claim:

1. The process which comprises contacting a 3-lower alkyl enol ether of a 6-formyl-steroid selected from steroids of the pregnane and androstane series with a mineral acid to form the corresponding 3-keto-6-formyl-4-unsaturated steroid compound.

2. The process which comprises reacting the 3-alkyl enol ether of a 3-keto-4-unsaturated steroid selected from steroids of the pregnane and androstane series with a mixture of dimethylformamide and phosgene to form the corresponding 6-formyl steroid compound, and reacting the latter with a mineral acid to produce the corresponding 3-keto-6-formyl-4-unsaturated steroid compound.

3. 6 - formyl - 9α - fluoro - 11β,17α,21 - trihydroxy-4-pregnene-3,20-dione 21-acetate.

4. 6 - formyl - 9α - fluoro - 11β,17α,21 - trihydroxy-16α-methyl-4-pregnene-3,20-dione 21-acetate.

5. 6-formylprogesterone.

6. 6-formyl-17α-acetoxyprogesterone.

7. 6-formyltestosterone.

8. 6 - formyl - 11β,17α,21 - trihydroxy - 4 - pregnene-3,20-dione 21-propionate.

9. 6-formyl-4-androstene-3,17-dione.

References Cited

UNITED STATES PATENTS 3,114,750   12/1963   Kirk et al. _____ 260—239.55

ELBERT L. ROBERTS, *Primary Examiner.*

LEWIS GOTTS, *Examiner.*